US007880922B2

(12) United States Patent
Onishi

(10) Patent No.: US 7,880,922 B2
(45) Date of Patent: Feb. 1, 2011

(54) IMAGE FORMING APPARATUS, IMAGE PROCESSING APPARATUS AND IMAGE FORMING METHOD

(75) Inventor: Takeshi Onishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1354 days.

(21) Appl. No.: 11/372,197

(22) Filed: Mar. 10, 2006

(65) Prior Publication Data

US 2006/0279751 A1 Dec. 14, 2006

(30) Foreign Application Priority Data

Jun. 13, 2005 (JP) .......................... P2005-171885

(51) Int. Cl.
*G06K 15/00* (2006.01)
*H04N 1/46* (2006.01)
*H04N 1/04* (2006.01)

(52) U.S. Cl. ......................... 358/1.2; 358/510; 358/480

(58) Field of Classification Search ................. 347/255, 347/234, 6, 19, 15, 102; 358/1.8, 1.9, 1.7, 358/2.1, 32.8, 510, 380, 3.07
See application file for complete search history.

(56) References Cited

U.S. PATENT DOCUMENTS 5,929,892 A * 7/1999 Towner et al. .............. 347/255
7,063,264 B2 * 6/2006 Bi et al. ...................... 235/487
2002/0070281 A1 6/2002 Nimura et al.
2003/0025785 A1 * 2/2003 Nihei et al. ................ 347/250
2003/0175603 A1 * 9/2003 Nakata et al. ............. 430/58.1
2005/0134875 A1 * 6/2005 Currans et al. ............... 358/1.9
2006/0017761 A1 * 1/2006 Matsuzawa et al. ........... 347/15
2007/0057987 A1 * 3/2007 Miyamoto et al. ............ 347/19
2009/0207198 A1 * 8/2009 Muraoka ....................... 347/6

FOREIGN PATENT DOCUMENTS

JP 2001-265181 9/2001
JP 2002-240387 8/2002
JP A-2002-254387 8/2002

* cited by examiner

*Primary Examiner*—Jerome Grant, II
(74) *Attorney, Agent, or Firm*—Morgan, Lewis & Bockius LLP

(57) ABSTRACT

An image forming apparatus includes a first toner image forming section that forms a visible toner image, a second toner image forming section that forms an invisible toner image, in which a resolution of the invisible toner image is lower than a resolution of the visible toner image, and a transfer section that transfers to a medium the visible toner image and the invisible toner image.

9 Claims, 13 Drawing Sheets

IMAGE FORMING APPARATUS, IMAGE PROCESSING APPARATUS AND IMAGE FORMING METHOD

CROSS-REFERENCE TO RELATED APPLICATIONS

The entire disclosure of Japanese Patent Application No. 2005-171885 including specification, claims, drawings, and abstract is incorporated herein by reference in its entirely.

BACKGROUND

1. Technical Field

The present invention relates to an image forming apparatus such as a copy machine and a printer, an image processing apparatus and the like, which processes image data formed by the image forming apparatus, and an image forming method.

2. Related Art

In recent years, a technology in which a user writes a letter or picture on a special paper on which fine dots are printed, and transfers data such as the letter and the like written on the paper to a personal computer, mobile telephone and the like, thus enabling saving and mail transmission of the contents, has attracted attention. The technology is configured in such a way that small dots are printed on the special paper at an interval of, for example, around 0.3 mm, which depicts a different pattern, for example, for each grid of a prescribed size. By reading this using, for example, a special pen with a built-in digital camera, the position of the letter and the like written on the special paper can be identified, and this kind of letter and the like can be used as electronic information.

In recent years, however, it has become possible to output a high quality image from an image forming apparatus such as a copy machine or a printer. For example, with regard to an image resolution, an image forming apparatus with a high resolution of 1200 dpi, 2400 dpi has appeared. Also, with regard to an accuracy of the image formation position, present copy machines and printers have improved to a unit of 100 μm.

Along with this improvement in image quality, a high quality has come to be required for an image which a user peruses (a document image obtained from an electronic document, a photographic image obtained from a photographed image and the like) Contrarily, in the case of a code image which is used, not for the user to peruse, but simply to read some information mechanically, there is not such a demand for a high quality.

SUMMARY

The present invention has been made in view of the above circumstances and provides an image forming apparatus, an image processing apparatus and an image forming method.

According to an aspect of the present invention, an image forming apparatus includes a first toner image forming section that forms a visible toner image, a second toner image forming section that forms an invisible toner image, in which a resolution of the invisible toner image is lower than a resolution of the visible toner image, and a transfer section that transfers to a medium the visible toner image and the invisible toner image.

BRIEF DESCRIPTION OF THE DRAWINGS

Exemplary embodiment(s) of the present invention will be described in detail based on the following figures, wherein.

DETAILED DESCRIPTION

Exemplary embodiments will hereafter be described with reference to the accompanying drawings.

Figure 1:
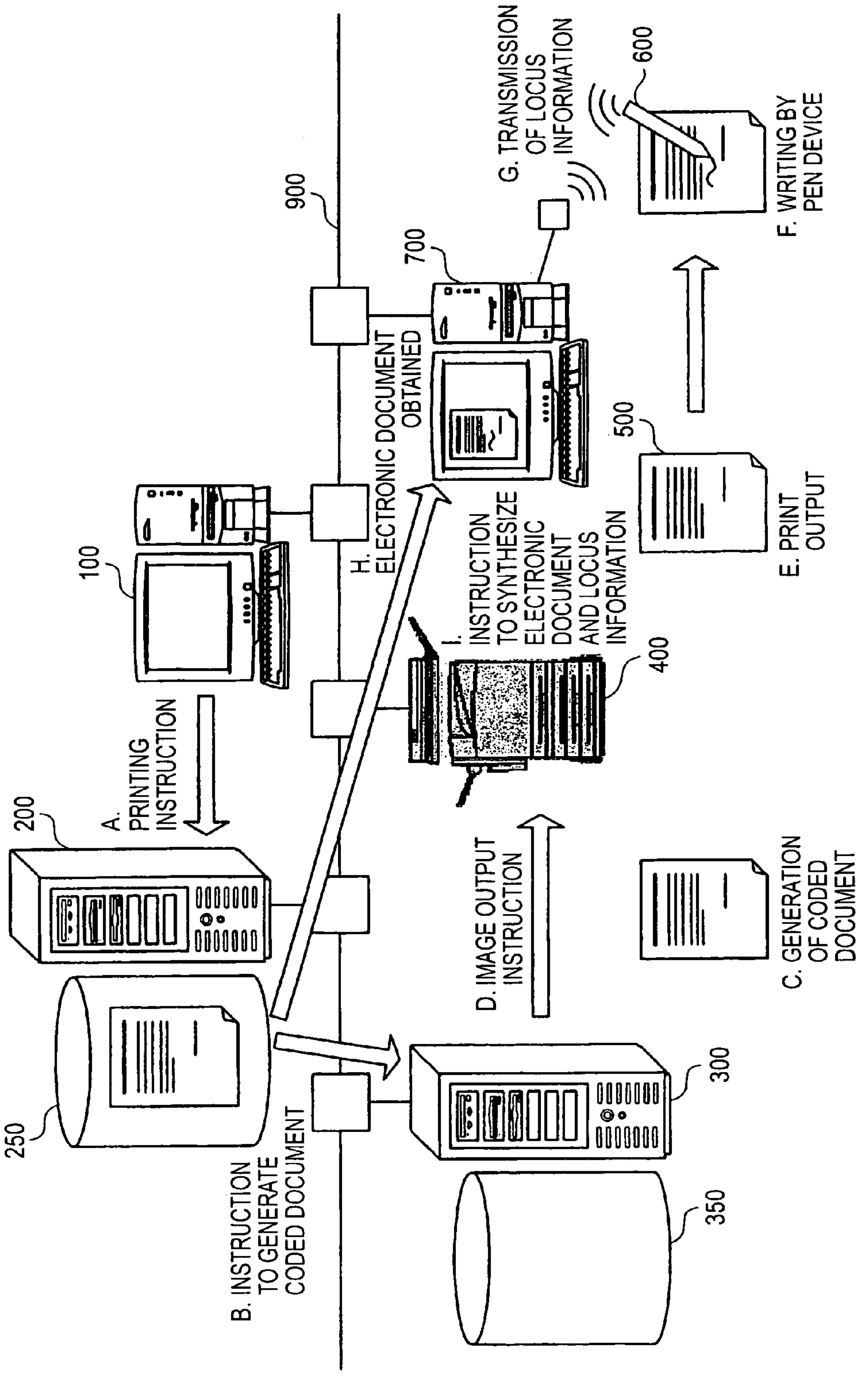
FIG. 1 is a diagram showing an overall configuration of a system to which an exemplary embodiment of the invention is applied.

FIG. 1 shows one example of a configuration of a system to which the exemplary embodiment is applied. The system includes, at least, a terminal apparatus 100 which instructs a printing of an electronic document, a document management server 200, which manages the electronic document to be printed, an identification information management server 300, which generates a document with code, in which a code image indicating identification information and the like is added to the document image of the electronic document for which printing has been instructed, and an image forming apparatus 400, which prints the document with code, all connected to a network 900.

Also, a document repository 250 is connected to the document management server 200 as a memory device which stores the electronic document, and an identification information repository 350 is connected to the identification information management server 300 as a memory device which stores the identification information used to identify a page of the electronic document.

Furthermore, the system includes a paper with code image 500 output by the image forming apparatus 400, and a pen device 600 which records a letter or figure on the paper with code image 500 and reads a recording information of the letter or figure. A terminal apparatus 700, which displays a superimposition of the document managed by the document management server 200 and the recording information read by the pen device 600, is also connected to the network 900

An outline of the operation of the system will hereafter be described.

Firstly, (A) the terminal apparatus 100 instructs the document management server 200 to print a specific electronic document managed by the document repository 250.

As a result, (B) the document management server 200 transmits the electronic document for which printing has been instructed to the identification information management server 300, instructing it to generate a document with code by adding a code image indicating identification information and position information to the document image of the electronic document. (C) The identification information management server 300 which receives this instruction generates a document with code by adding a code image, which indicates an identification information managed by the identification information repository 350 and a paper surface position information (coordinate information), to a document image of the electronic document for which printing has instructed.

Next, (D) the identification information management server 300 instructs the image forming apparatus 400 to output the image of the document with code. As a result, (E) the image forming apparatus 400 outputs the paper with code image 500.

As will be described in detail hereafter, the image forming apparatus 400 forms a code image provided by the identification information management server 300 as an invisible image by section of invisible toner, and forms other images (images in the portion included in the original electronic document) as visible images by section of visible toner.

Subsequently, (F) a user records (writes) a letter or figure on the paper with code image 500 using the pen device 600. By this section, the pickup device of the pen device 600 traps a certain area on the surface of the paper with code image 500, obtaining identification information and position information. (G) The identification information, and locus information of the letter or figure calculated in accordance with the position information, are transmitted via wireless or wire to the terminal apparatus 700. According to the system, it is possible to form an invisible image using an invisible toner with an infrared light absorptance higher than a prescribed standard, and read the invisible image using the pen device 600, which is capable of emitting and detecting infrared light.

By this section, the terminal apparatus 700, using the identification information as a key, (H) obtains a specific page of the specific electronic document to be printed from the document management server 200, and (I) combines and displays the obtained page and the locus information transmitted from the pen device 600. Also, the terminal apparatus 700 can, based on the position information indicated, access a document and the like to be linked which are located at that position.

This kind of configuration, however, is merely one example. The functions of the identification information management server 300 can also be given to the document management server 200, or actualized as a function of an image processor of the image forming apparatus 400. Also, according to the embodiment, an electronic document is described as an object of printing, but application is also possible to a printing in accordance with electronic data not coming under the category of an electronic document, such as, for example, a photographic image.

Next, a more detailed description will be made of each configuration of the system shown in FIG. 1.

Figure 2:
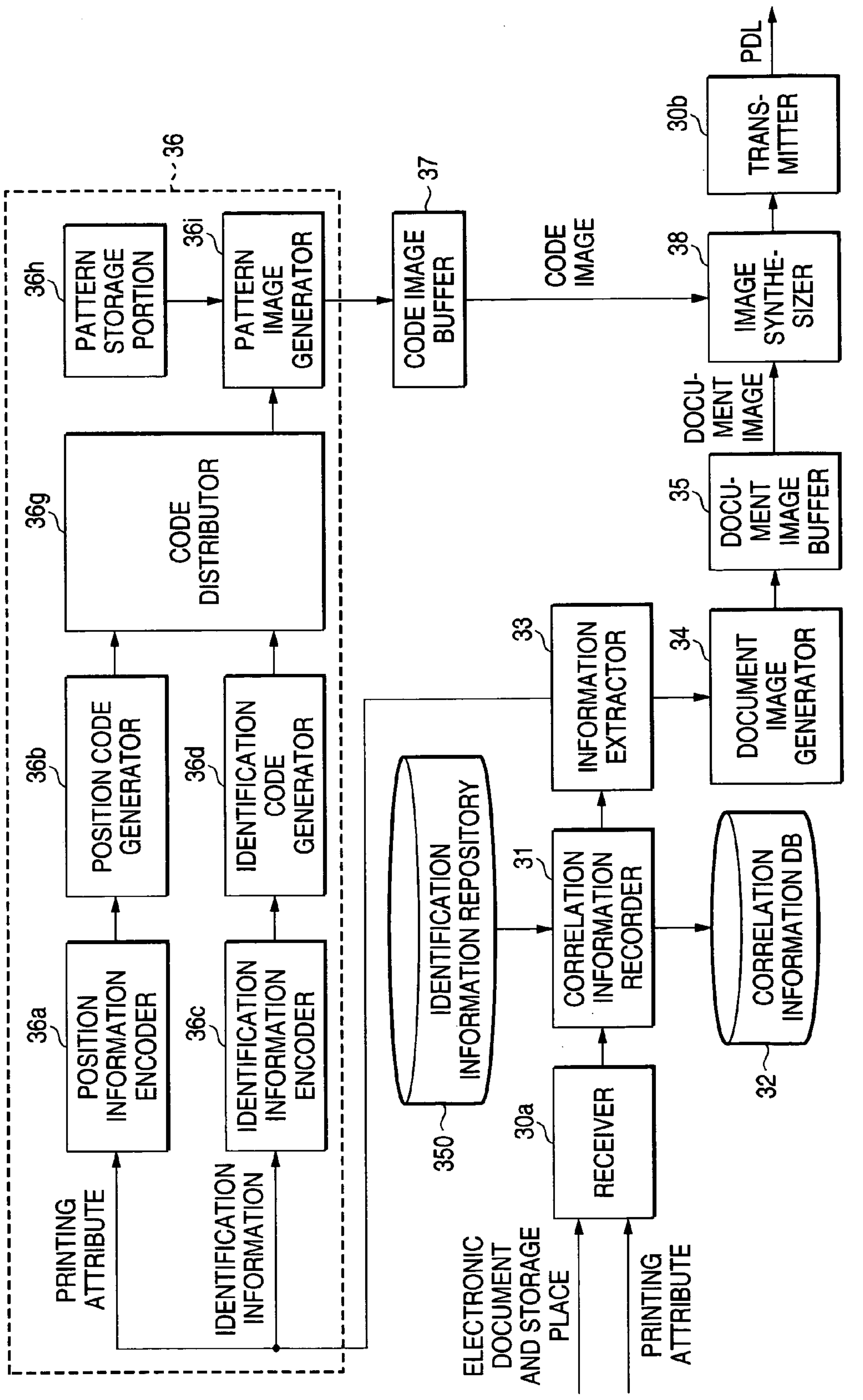
FIG. 2 is a diagram showing a functional configuration diagram of an identification information management server according to the embodiment of the invention.

FIG. 2 is a diagram showing one example of a configuration of the identification information management server 300. To facilitate the description, the figure also shows the identification information repository 350.

The identification information management server 300 includes a receiver 30*a*, a correlation information recorder 31, a correlation information database (DB) 32, an information extractor 33, a document image generator 34, a document image buffer 35, a code image generator 36, a code image buffer 37, an image overlay part 38 and a transmitter 30*b*.

Also, the code image generator 36 includes a position information encoder 36*a*, a position code generator 36*b*, an identification information encoder 36*c*, an identification code generator 36*d*, a code distributor 36*g*, a pattern storage portion 36*h* and a pattern image generator 36*i*.

The receiver 30*a* receives an electronic document to be printed, a storage place of the document, and a printing attribute (paper size, direction and the like) from the network 900, and passes the information to the correlation information recorder 31.

The correlation information recorder 31 obtains identification information from the identification information repository 350, and records the storage place and the like received from the receiver 30, correlating it with the identification information.

The correlation information DB 32 is a database which, in accordance with an instruction from the correlation information recorder 31, stores the correlation between the identification information and the storage place of the electronic document.

The information extractor 33 extracts an information (the printing attribute, the identification information) necessary for the generation of a code image from the information received by the correlation information recorder 31.

The document image generator 34 generates an image of the electronic document from the information extracted by the information extractor 33, and stores the image in the document image buffer 35.

The code image generator 36 generates a code image using the information extracted by the information extractor 33, and stores the image in the code image buffer 37.

The image overlay part 38 overlays the code image stored in the code image buffer 37 on the document image stored in the document image buffer 35.

The transmitter 30*b* transmits an instruction to output the image, which is obtained by overlaying by the image overlay part 38, to the image forming apparatus 400 as a PDL (Page Description Language) represented by PostScript and the like.

The position information encoder 36*a* encodes the position information according to a prescribed encoding method. For example, a previously known error revision code, such as RS (Reed-Solomon) code or BCH code, can be used for the encoding. Also, as an error detection code, it is possible to calculate a position information CRC (Cyclic Redundancy Check) and checksum value, and add it to the position information as a redundancy bit. Furthermore, it is possible to use an M series code, which is one kind of pseudo noise series, as the position information. The M series code is used to carry out encoding by using the property that, in the case of a P-order M series (series length $2^{P-1}$), when a partial series of length P is removed from the M series, the bit pattern which appears in the partial series only appears once in the M series.

The position code generator 36 converts the encoded position information to an embedded format as code information.

For example, in order to make it difficult for a third person to decipher, the distribution of each bit in the encoded position information can be interchanged or encrypted by pseudo random numbers and the like. Also, in the case that the position code is distributed two-dimensionally, the bit value is distributed two-dimensionally in the same way as the code distribution.

According to the embodiment, the printing attributes such as paper size and direction are passed from the information extractor 33 to the position information encoder 36*a*, whereupon the position information encoder 36*a* selects an encoding position information, which corresponds to the printing attributes received, from those generated and stored in advance for each printing. This is because, once the paper size and direction have been decided, one position code can be specified for printing on the paper.

However, in the event that the size and direction of the printing paper are the same, the position code for printing on the paper will be permanently the same. Consequently, in the event that printing is to be carried out for only the same paper size and direction, the position information encoder 36*a* and the position code generator 36*b* can be brought together as a position code storage portion for one set of position code, and the position code can be used permanently.

When the identification information is input, the identification information encoder 36*c* encodes the identification information according to a prescribed encoding method. The same encoding method as that used for encoding the position information can be used for this encoding. From the point of view of obtaining identification information, the identification information encoder 36*c* can also be taken as identification information obtaining section.

The identification code generator 36*d* converts the encoded identification information to an embedded format as code information. For example, in order to make it difficult for a third person to decipher, the distribution of each bit in the encoded identification information can be interchanged or encrypted by pseudo random numbers and the like. Also, in the case that the identification code is distributed two-dimensionally, the bit value is distributed two-dimensionally in the same way as the code distribution.

The code distributor 36*g* composes the encoded position information and the encoded identification information, which have been distributed according to the same format as the code, and generates a two-dimensional code arrangement equivalent to the size of the output image. When so doing, the encoded position information uses a code obtained by encoding position information which differs according to the distribution position, whereas the encoded identification information uses a code obtained by encoding the same information, regardless of position.

The pattern image generator 36*i* checks the bit value of the arrangement factor in the two-dimensional code arrangement, obtains a bit pattern image corresponding to each bit value from the pattern storage portion 36*h*, and outputs a code image obtained by imaging the two-dimensional code arrangement.

The functional portions are actualized by a co-ordination of a software and a hardware resource. Particularly, a not-shown CPU of the identification information management server 300 reads a program actualizing the receiver 30*a*, correlation information recorder 31, information extractor 33, document image generator 34, code image generator 36, image overlay part 38 and transmitter 30*b* from an external storage device into a main storage device, and processes the program.

Next, the operation of the identification information management server 300 in this case will be described.

According to the identification information management server 300, firstly, the receiver 30*a* receives an electronic document, a storage place of the document, and a printing attribute (paper size, direction and the like), and passes the information received to the correlation information recorder 31.

As a result, the correlation information recorder 31 removes an identification information from the identification information repository 350, and records the correlation information, which relates to the correlation between the identification information and the electronic document storage place, in the correlation information DB 32. The electronic document, the printing attribute and the identification information are then output to the information extractor 33.

Subsequently, the information extractor 33 extracts information necessary for the generation of a code image from the information received. Particularly, the printing attribute and the identification information correspond to this information.

Consequently, position information corresponding to the printing attribute is encoded in the position information encoder 36*a*, and a position code indicating the encoded position information is generated in the position code generator 36*b*. Also, identification information is encoded in the identification information encoder 36*c*, and an identification code indicating the encoded identification information is generated in the identification code generator 36*d*.

Furthermore, a two-dimensional code arrangement equivalent to the size of the image output is generated by the code distributor 36*g*, and a pattern image corresponding to the two-dimensional code arrangement is generated by the pattern image generator 36*i*.

The information extractor 33 sends to the document image generator 34 the information (information relating to the electronic document and the like) remaining after the information necessary for the code generation is extracted, and the document image generator 34 generates a document image of the electronic document.

Then finally, the code image generated in advance by the code image generator 36 is overlaid on the document image generated by the document image generator 34 by the image overlay part 38, and sent to the transmitter 30*b*. As a result, the transmitter 30*b* transmits the image obtained by overlaying to the image forming apparatus 400.

FIGS. 3(A) to 3(D) are diagrams to illustrate a two-dimensional code image generated by the code image generator 36 of the identification information management server 300. FIG. 3(A) is a diagram in a lattice form, in order to schematically illustrate, units of two-dimensional code images formed by invisible images and distributed. FIG. 3(B) is a diagram showing one unit of two-dimensional code image whose invisible code image is recognized under infrared light irradiation. Furthermore, FIG. 3(C) is a diagram to illustrate a backslash (\) and FIG. 3(D) is a diagram to illustrate a slash (/) diagonal pattern.

A two-dimensional code image formed by the image forming apparatus 400 is formed by an invisible toner having, for example, a maximum absorptance of for example 7% or less in a visible light region (400 nm to 700 nm) and an absorptance of for example 30% or more in a near-infrared region (800 nm to 1000 nm). Also, in order to increase the near-infrared absorptive power necessary for a mechanical reading of an image, an invisible toner with an average dispersal diameter in the range of 100 nm to 600 nm is employed. In this case, "visible" and "invisible" has no connection to being discernible or not to the naked eye. A categorization of "visible" or "invisible" depends on whether or not the image formed on a printed medium is discernible via the existence or non-existence of a chromogenic property originating in the absorption of a specified wavelength in the visible light region.

The two-dimensional code image shown in FIGS. 3(A) to 3(D) is formed by an invisible image which enables long-term, dependable mechanical reading via infrared light irradiation and encoding processing, as well as a high density recording of information. Also, it is preferable that the invisible image can be positioned in an optional area, regardless of the area of the surface of the medium which outputs an image in which the visible image is positioned. According to the embodiment, the invisible image is formed on the whole of one surface of the medium (paper surface) in accordance with the size of the medium printed. Also, it is more preferable still that the invisible image be discernible by the difference in gloss when viewed by the naked eye. The"whole surface" does not mean, however, that all four corners of the paper are included. It is often the case with an apparatus such as one using an electronic photographic method that, normally, the periphery of the paper is a range which cannot be printed, meaning that it is unnecessary to print an invisible image in such a range.

The two-dimensional code pattern shown in FIG. 3(B) includes an area in which a position code indicating a coordinate position on a medium is stored and an area in which an identification code for clearly identifying an electronic document or printing medium is stored. An area in which a sychronization code is stored is also included. Also, as shown in FIG. 3(A), plural the two-dimensional code patterns are distributed, and the two-dimensional codes in which various position information is stored are distributed in a lattice form on the whole of one surface of the medium (paper surface) in accordance with the size of the medium printed. That is, plural two-dimensional code patterns such as shown in FIG. 3(B) are distributed on one surface of the medium, with each one being provided with a position code, an identification code and a synchronization code. Also, position information differing according to a place of distribution is stored in an area of the plural position codes. The same identification information is stored in an area of the plural identification codes, regardless of a place of distribution.

In FIG. 3(B), the position code is distributed inside a 6 bit×6 bit rectangular area. Each bit value is formed by plural minute line bit maps of differing angles of rotation, and the diagonal line patterns (pattern 0 and pattern 1) shown in FIG. 3(C) and 3(D) express a bit value 0 and a bit value 1. More particularly, bit 0 and bit 1 are expressed using the backslash (\) and slash (/), which have a different tilt with respect to each other. The diagonal line pattern includes a size of 8×8 pixels at 600 dpi, wherein the top left to bottom right diagonal line pattern (pattern 0) expresses the bit value 0, and the top right to bottom left diagonal line pattern (pattern 1) expresses the bit value 1. Consequently, the information for one bit (0 or 1) can be expressed by one diagonal line pattern. By using a minute line bit map including 2 kinds of tilt, a two-dimensional code pattern can be provided wherein a noise given to a visible image is extremely low, and a large amount of information can be digitalized at a high density and embedded.

That is, a total of 36 bits of position information are stored in the position code area shown in FIG. 3(B). Of the 36 bits, 18 bits can be used for the encoding of an X coordinate, and 18 bits for the encoding of a Y coordinate. In the case that all 18 bits are used for position encoding, $2^{18}$ positions (approximately 260,000 positions) can be encoded. In the case that each diagonal line pattern has 8×8 pixels (600 dpi) as shown in FIGS. 3(C) and 3(D), where one dot of 600 dpi is 0.0423 mm, the size of the two-dimensional code (including the synchronization code) of FIG. 3(B) is in the order of 3 mm (8 pixels×9 bits×0.0423 mm) vertically and horizontally. In the case that 260,000 positions are encoded at 3 mm intervals, a length of approximately 786 mm can be encoded. All 18 bits can be used for position encoding, as described heretofore, or, in the event that a diagonal line pattern detection error may occur, a redundancy bit can be included for the purpose of detecting and correcting the error.

Also, the identification code is distributed in a rectangular area of 2 bits×8 bits and 6 bits×2 bits, meaning that a total of 28 bits of identification information can be stored. In the case that all 28 bits are used as identification information, $2^{28}$ pieces (approximately 270 million pieces) of identification information can be expressed. As in the case of the position code, the identification code can include a redundancy bit among the 28 bits for the purpose of detecting and correcting an error.

Figure 3:
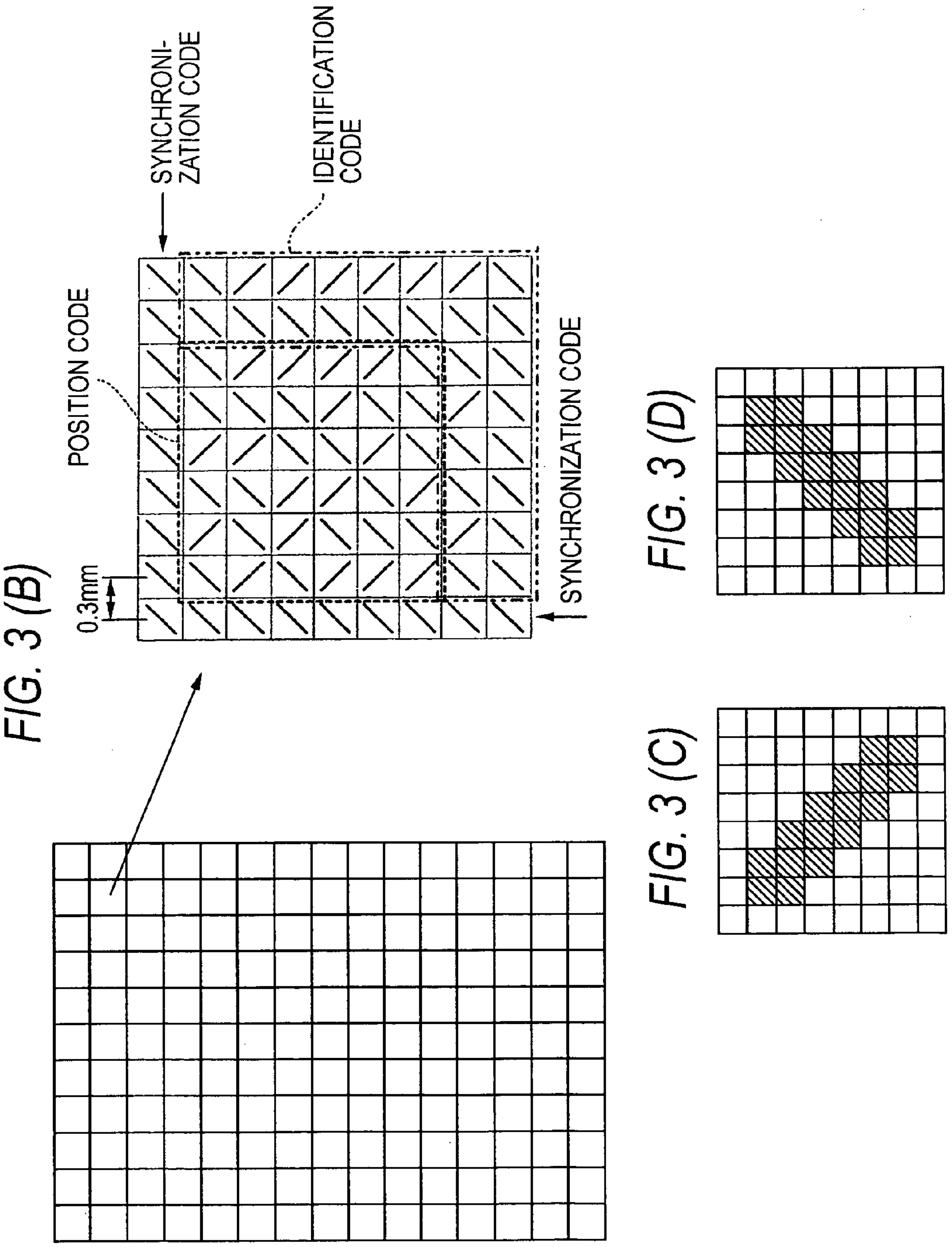
FIGS. 3(A) to 3(D) are diagrams to illustrate a two-dimensional code image generated by the identification information management server according to the embodiment of the invention.

Furthermore, in the example shown in FIG. 3(*c*), the two diagonal line patterns differ from each other in angle by 90 degrees, but 4 kinds of diagonal line pattern can be configured by making the difference in angle 45 degrees. With this kind of configuration, 2-bit information (0 to 3) can be expressed by one diagonal line pattern. That is, by increasing the angle kinds of the diagonal line pattern, the number of bits which can be expressed can be increased.

Also, in the example in FIGS. 3(C) and 3(D), the encoding of the bit value is described using a diagonal line pattern, but the choice of pattern is not limited to the diagonal line pattern. It is also possible to use an encoding method whereby a dot is turned on/off and a dot position is shifted from a standard position.

Next, the image forming apparatus 400 will be described in detail.

Figure 4:
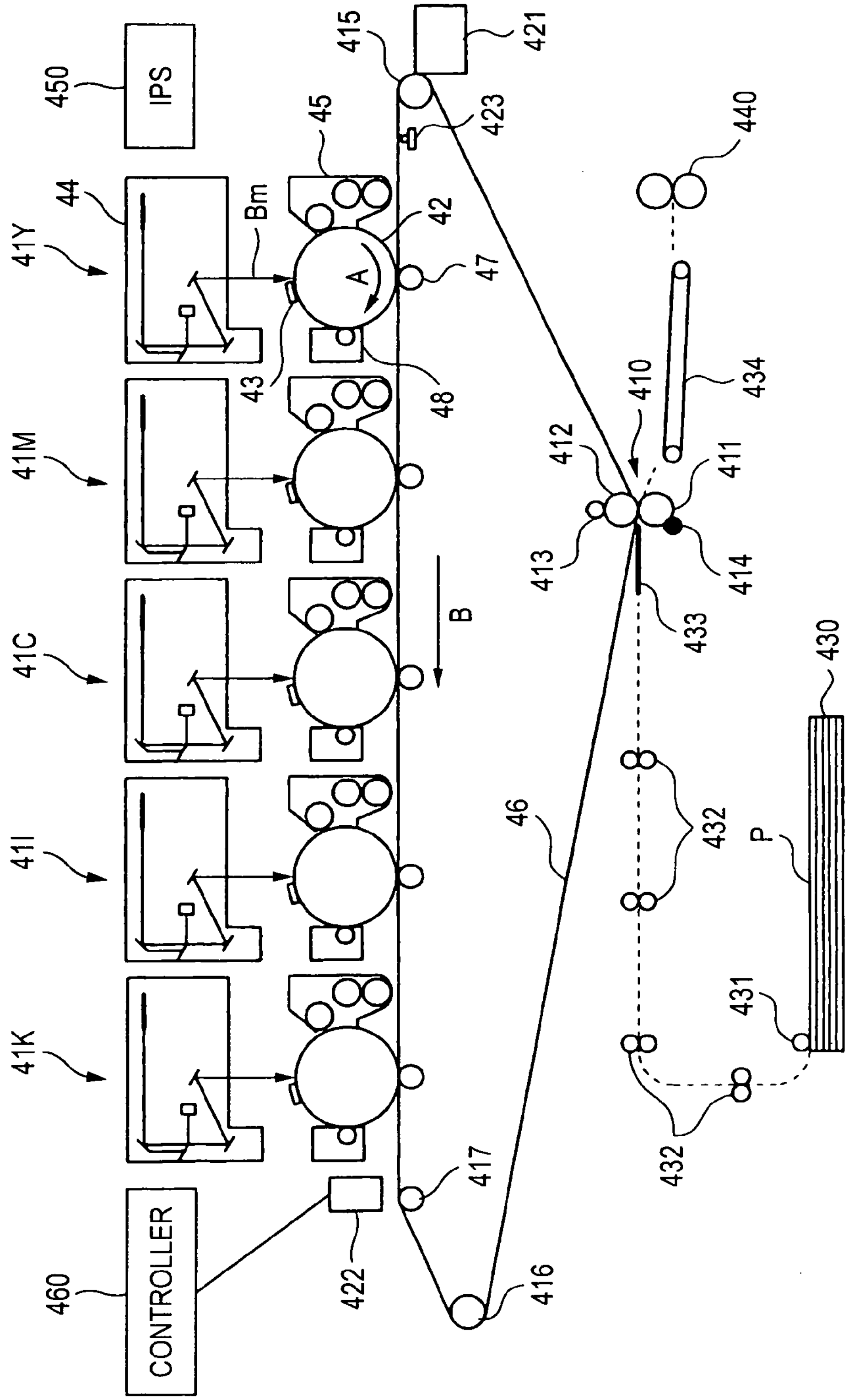
FIG. 4 is a diagram showing a first configuration example of an image forming apparatus according to the embodiment of the invention.

FIG. 4 is a diagram showing a first configuration example of the image forming apparatus 400. The image forming apparatus 400 shown in FIG. 4 is a so-called tandem type apparatus including, for example, plural image forming units 41 (41Y, 41M, 41C, 41I, 41K) in which a toner image of each colour component is formed according to an electronic photographic method, an intermediate transfer belt 46 which sequentially transfers (primary transfer) and maintains each colour component toner image formed by each image forming unit 41, a secondary transfer device 410 which collectively transfers (secondary transfer) a superimposed image transferred onto the intermediate transfer belt 46 onto a paper (medium) P, and a fixing device 440 which fixes the secondary transfer image onto the paper P.

The image forming apparatus 400 includes, as well as the image forming units 41Y, 41M and 41C, which form toner images of common colours (normal colours), yellow (Y), magenta (M) and cyan (C), the image forming unit 41K, which forms a toner image in black (K) which does not absorb infrared, and the image forming unit 411, which forms an invisible toner image, as one image forming unit configuring a tandem. A composition of the toner will be described in detail hereafter.

According to the embodiment, each image forming unit 41 (41Y, 41M, 41C, 41I, 41K) is equipped in order with electr-photographic devices such as, on the periphery of a photoreceptor drum 42 which rotates in the direction of arrow A, a charger 43 which charges the photoreceptor drum 42, a laser exposure unit 44 (an exposure beam is indicated by Bm in the figure) which writes an electrostatic latent image on the photoreceptor drum 42, a developer 45 in which each colour component toner is contained and which uses the toner to render visible the electrostatic latent image on the photoreceptor drum 42, a primary transfer roll 47 which transfers each colour component toner image formed on the photoreceptor drum 42 to the intermediate transfer belt 46, and a drum cleaner 48 which removes residual toner from the photoreceptor drum 42. The image forming units 41 are arranged sequentially in the following order from the upstream side of the intermediate transfer belt 46: a yellow (Y colour), a magenta (M colour), a cyan (C colour), an invisible (I colour) and a black (K colour).

Also, the intermediate transfer belt 46 is configured in such a way that it can rotate in a direction B shown in the figure by section of various rollers. The various rollers include a drive roller 415 which is driven by a not-shown motor to rotate the intermediate transfer belt 46, a tension roller 416 which, as well as applying a constant tension to the intermediate transfer belt 46, has a function of preventing a winding movement of the intermediate transfer belt 46, an idle roller 417, which supports the intermediate transfer belt 46, and a backup roller 412 (to be described hereafter).

Furthermore, as a voltage of opposite polarity to that of the charging polarity of the toner is applied to the primary transfer roller 47, the toner image on each photoreceptor drum 42 is electrostatically suctioned, in order, onto the intermediate transfer belt 46, so that a superimposed toner image is formed on the intermediate transfer belt 46. Furthermore, the secondary transfer device 410 is provided with the secondary transfer roller 411 which is installed in pressure contact with the toner image holding surface side of the intermediate transfer belt 46, and the backup roller 412, which, positioned on the rear surface side of the intermediate transfer belt 46, acts as an opposite electrode to the secondary transfer roller 411. A metal feed roller 413, to which a secondary transfer bias is steadily applied, is positioned in contact with the backup roller 412. Also, a brush roller 414, which removes a dirt adhering to the secondary transfer roller 411, is installed in contact with the secondary transfer roller 411.

Also, a belt cleaner 421, which cleans the surface of the intermediate transfer belt 46 after the secondary transfer, is installed on the downstream side of the secondary transfer roller 411. Furthermore, an image sensor 422 is positioned on the upstream side of the secondary transfer roller 411 for the purpose of detecting misalignment of an image. Also, a standard sensor 423 (home position sensor), which emits a standard signal which acts as a standard for timing a formation of an image on each image forming unit 41, is positioned on the upstream side of the Y colour image forming unit 41Y. The standard sensor 43 is configured such that the sensor emits a standard signal upon detecting a prescribed mark provided on the rear of the intermediate transfer belt 46, and such that each image forming unit 41 starts an image formation according to an instruction from a controller (not shown) based on the detection of the standard signal.

Furthermore, according to the embodiment, a paper feeding system includes a paper tray 430, which contains a paper P, a pickup roller 431, which removes and feeds the paper P stacked in the paper tray 430 according to a prescribed timing, a feeder roller 432, which feeds the paper P ejected by the pickup roller 431, a feeder chute 433, which feeds the paper P fed by the feeder roller 432 into the secondary transfer position of the secondary transfer device 410, and a feeder belt 434, which feeds the paper P to the fixing device 440 after the secondary transfer.

Also, according to the embodiment, the paper feeding system includes an IPS (Image Processing System) 450, which processes an image which forms a base for the electrostatic latent image which the laser exposure unit 44 writes on the photoreceptor drum 42, and a controller 460, which controls the writing timing etc. of the electrostatic latent image by the laser exposure unit 44.

Next, the image forming process of the image forming apparatus 400 will be described. When a start switch (not shown) is turned on by the user, a prescribed image forming process will be carried out. More particularly, in the case, for example that the image forming apparatus 400 is configured as a colour printer, a digital image signal transmitted from the network 900 is temporarily stored in a memory, and a toner image formation for each colour is carried out in accordance with the digital image signal of the 5 colours (Y, M, C, K, I) stored.

That is, each image formation unit (41Y, 41M, 41C, 41I, 41K) is driven in accordance with an image recording signal for each colour obtained via the image processing. Subsequently, each electrostatic latent image corresponding to the image recording signal is written, by the laser exposure unit 44, on the photoreceptor drum 42 which has been uniformly charged by the charger 43, in each image formation unit (41Y, 41M, 41C, 41I, 41K). Also, each electrostatic latent image written is developed by the developer 45 containing each colour of toner, thereby forming a toner image for each colour.

Then, the toner image formed on each photoreceptor drum 42 is primarily transferred from the photoreceptor drum 42 to the surface of the intermediate transfer belt 46, by section of primary transfer bias applied by the primary transfer roller 47, at the primary transfer position at which each photoreceptor drum 42 and the intermediate transfer belt 46 come into contact. By this section, the toner images primarily transferred to the intermediate transfer belt 46 are superimposed on the intermediate transfer belt 46, and fed to the secondary transfer position in conjunction with the rotation of the intermediate transfer belt 46.

Subsequently, the paper P is fed to the secondary transfer position of the secondary transfer device 410 in accordance with the prescribed timing, whereon the secondary transfer roller 411 nips the paper onto the intermediate transfer belt 46 (the backup roller 412). Then, by employing a secondary transfer electrical field formed between the secondary transfer roller 411 and the backup roller 412, the superimposed toner image held on the intermediate transfer belt 46 is secondarily transferred to the paper P.

Subsequently, the paper P to which the toner image is transferred is fed to the fixing device 440 by the feeder belt 434, whereupon fixing of the toner image is carried out. Meanwhile, residual toner is removed from the intermediate transfer belt 46 by the belt cleaner 421 after the secondary transfer.

That is, the image forming apparatus 400 shown in FIG. 4 is configured such that, in an existing image forming apparatus having the image forming unit 41 (41Y, 41M, 41C, 41K), the invisible toner image forming unit 41I is positioned between the image forming unit 41K for the K toner and the image forming unit 41C for the C toner.

Also, the image forming unit 41I uses a colorant with greater absorption of infrared light than the Y toner, M toner, C toner and K toner used in the image forming units 41Y, 41M, 41C and 41K. This kind of colorant includes, for example, a colorant containing vanadyl naphthalocyanine. In order to further facilitate detection of the code image, it is preferable that the K toner used in the image forming unit 41K be a colorant having less absorption of infrared light than the colorant used in the image forming unit 41I, but it is also possible to use a generally used colorant which absorbs infrared light, such as a colorant containing carbon.

Figure 5:
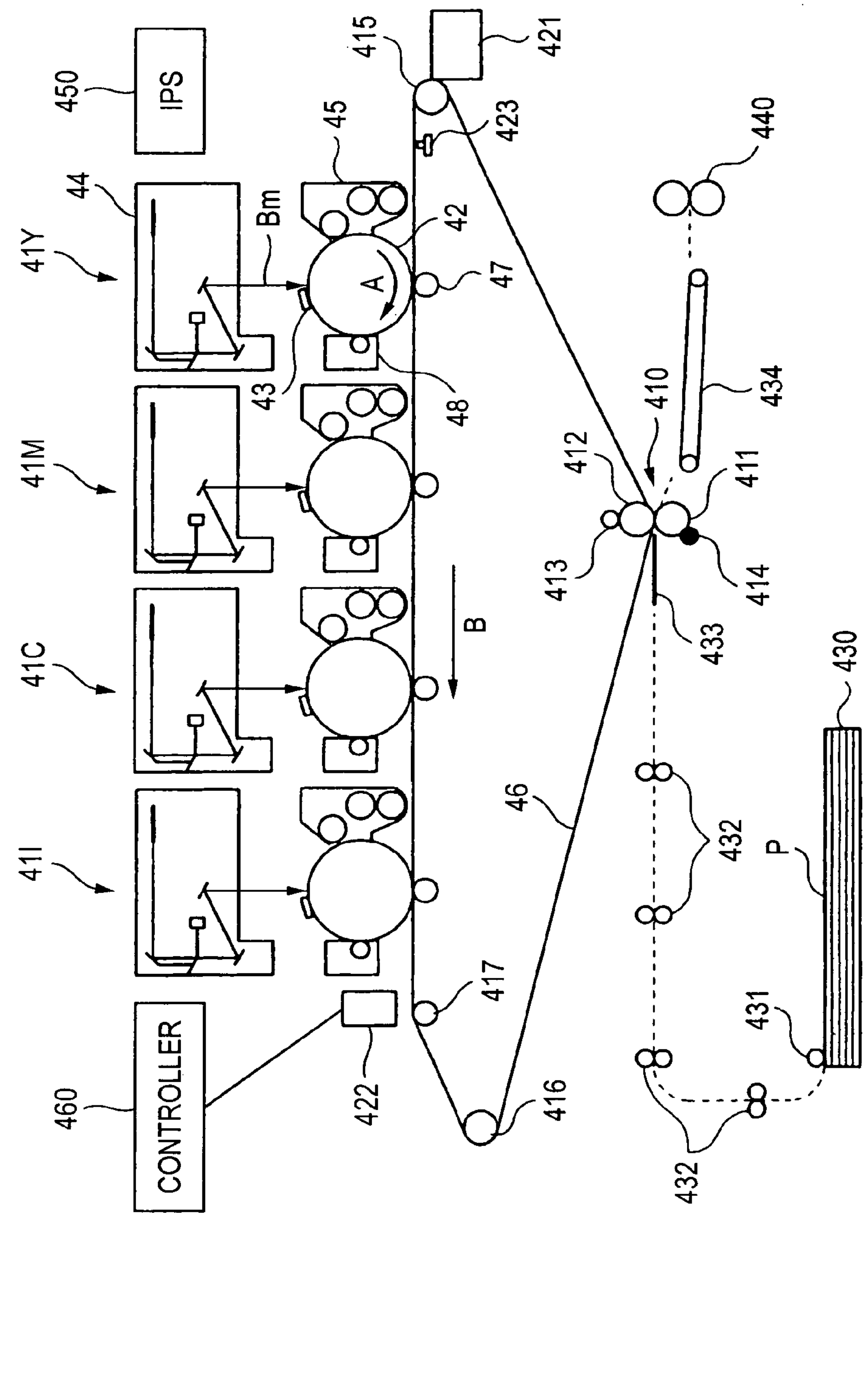
FIG. 5 is a diagram showing a second configuration example of the image forming apparatus according to the embodiment of the invention.

FIG. 5 is a diagram showing a second configuration example of the image forming apparatus 400. The image forming apparatus 400 is configured such that, in an existing image forming apparatus having the image forming unit 41 (41Y, 41M, 41C, 41K), the invisible toner image forming unit 41I is provided in the K toner image forming unit 41K position. As all other configurations and image forming processes are the same as for the image forming apparatus 400 shown in FIG. 4, the description will not be included.

Also, as with the image forming apparatus 400 shown in FIG. 4, the image forming unit 41I uses a colorant with greater absorption of infrared light than the Y toner, M toner, C toner and K toner used in the image forming units 41Y, 41M, 41C and 41K. This kind of colorant includes, for example, a colorant containing vanadyl naphthalocyanine.

Figure 6:
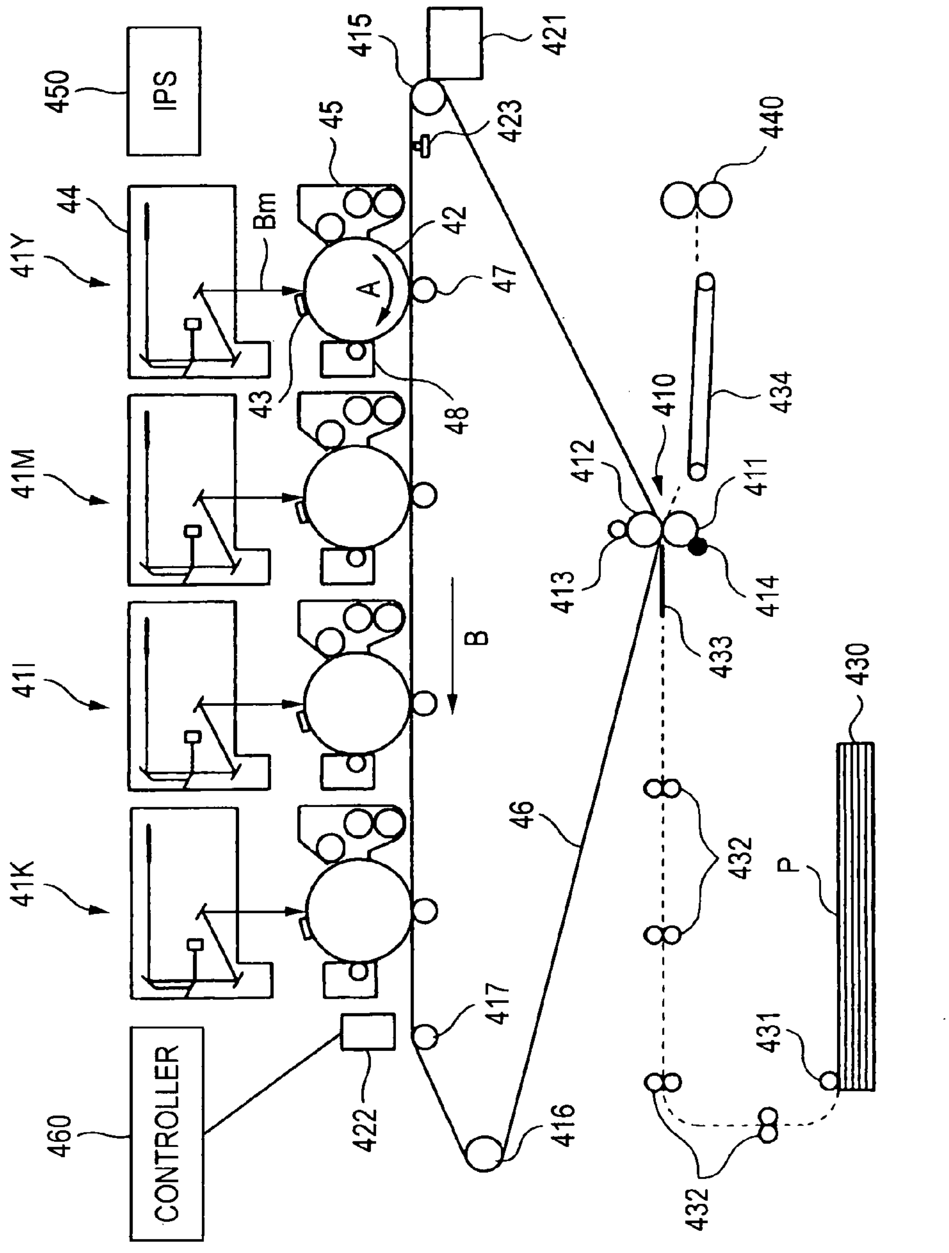
FIG. 6 is a diagram showing a third configuration example of the image forming apparatus according to the embodiment of the invention.

FIG. 6 is a diagram showing a third configuration example of the image forming apparatus 400. The image forming apparatus 400 is configured such that, in an existing image forming apparatus having the image forming unit 41 (41Y, 41M, 41C, 41K), the invisible toner image forming unit 41I is provided in the C toner image forming unit 41C position. As all other configurations and image forming processes are the same as for the image forming apparatus 400 shown in FIG. 4, the description will be omitted.

Also, as with the image forming apparatus shown in FIG. 4, the image forming unit 411 uses a colorant with greater absorption of infrared light than the Y toner, M toner and K toner used in the image forming units 41Y, 41M and 41K. This kind of colorant includes, for example, a colorant containing vanadyl naphthalocyanine. Furthermore, in order to further facilitate detection of the code image, it is preferable that the K toner used in the image forming unit 41K be a colorant having less absorption of infrared light than the colorant used in the image forming unit 41I, but it is also possible to use a generally used colorant which absorbs infrared light, such as a colorant containing carbon.

According to the embodiment, a configuration described hereafter is adopted in this kind of image forming apparatus 400 in order to make the quality of the invisible image lower than that of the visible image.

(Image Processor)

As shown in FIGS. 4 to 6, the image forming apparatus 400 in the embodiment includes the IPS 450, which is an image processor. The IPS 450 is a portion which receives an image formation instruction signal, and generates image data which forms the basis of the image formation. According to the embodiment, when generating the image data which forms the basis of the visible image, the IPS 450 allots a comparatively large amount of memory thus making the resolution of the image data high, while when generating the image data which forms the basis of the invisible image, the IPS 450 allots a comparatively small amount of memory thus making the resolution of the image data low.

A detailed description of the IPS 450 according to the embodiment will be given hereafter.

Figure 7:
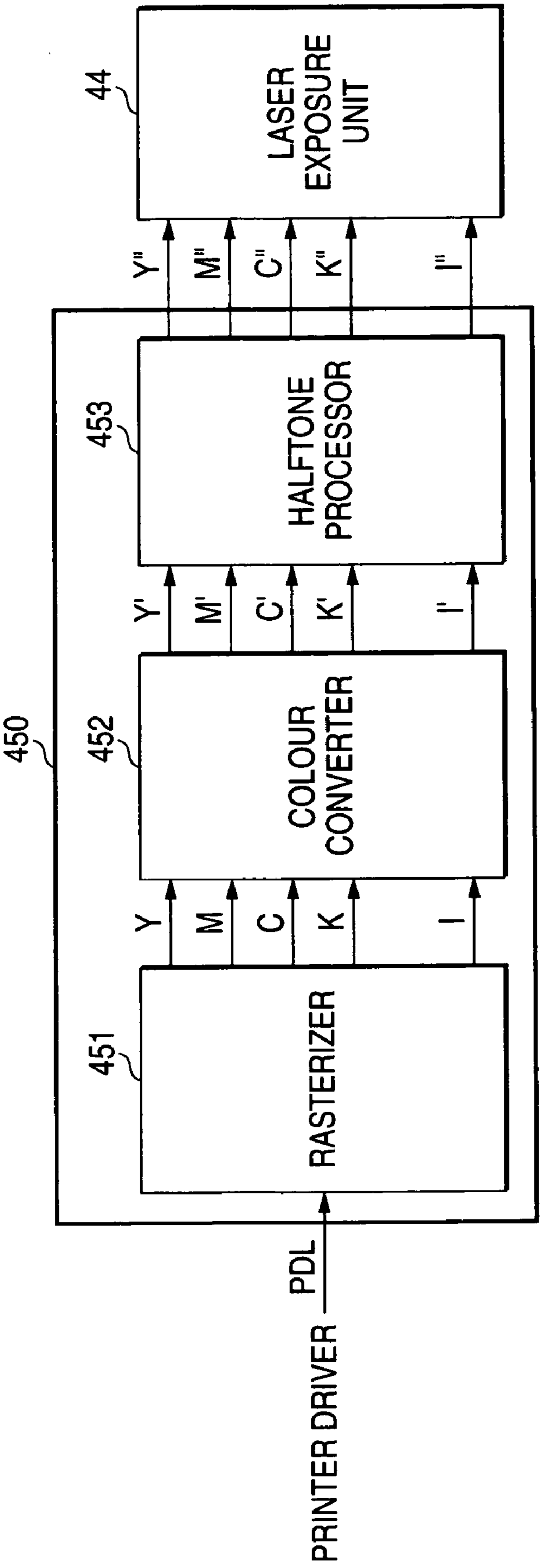
FIG. 7 is a diagram showing a configuration of an IPS according to the embodiment of the invention.

FIG. 7 is a block diagram showing a configuration of the IPS 450. In this case, supposing the IPS 450 in the image forming apparatus 400 shown in FIG. 4, the Y, M, C, K signals and the I signal, which is the signal instructing the formation of the invisible image, are illustrated.

The IPS 450 includes a rasterizer 451, a colour converter 452 and a halftone processor 453.

The rasterizer 451 converts a PDL input from a printer driver such as a PC (Personal Computer) into a raster format image data which can be output by the image forming apparatus 400.

The colour converter 452 converts the raster format image data transmitted from the rasterizer 451 in such a way that it is compatible with the image forming apparatus 400.

The halftone processor 453 converts the multi-level image data input by the colour converter 452 into a binary image data.

Next, the operation of the IPS 450 will be described.

On receiving the PDL printing instruction from the printer driver, first, the PDL converts the image instructed by the PDL into a raster format image. Next, the colour converter 452 carries out colour conversion processing on the image data transmitted from the rasterizer 451. Finally, the halftone processor 453 converts the multi-level image data into a binary image data after colour conversion.

At this point, the halftone processor 453 converts each of the Y, M, C and K signals into a high resolution dot image, while converting the I signal into a low resolution dot image. In this way, by carrying out low resolution processing on only the I signal, it is not necessary to allot as much memory for this process as the memory allotted for processing each of the Y, M, C and K signals. For example, in the case that the visible image is printed at 2400 dpi, and the invisible image is printed at 600 pdi, the amount of memory allotted for processing the I signal is one sixteenth of the amount of memory allotted for processing each of the Y, M, C and K signals. By configuring in this way, cost reduction can be planned.

(Optical Scanner)

In the description heretofore, a gap was established between the resolution of the visible image and the invisible image in the image processor, but it is also possible to establish a hardware based gap in resolution. According to the embodiment, in the visible-image image forming unit 41 and the invisible-image image forming unit 41, a gap is established in a hardware mechanism of the laser exposure unit 44, which is an optical scanner.

A detailed description of the laser exposure unit 44 according to the embodiment will be given hereafter.

Figure 8:
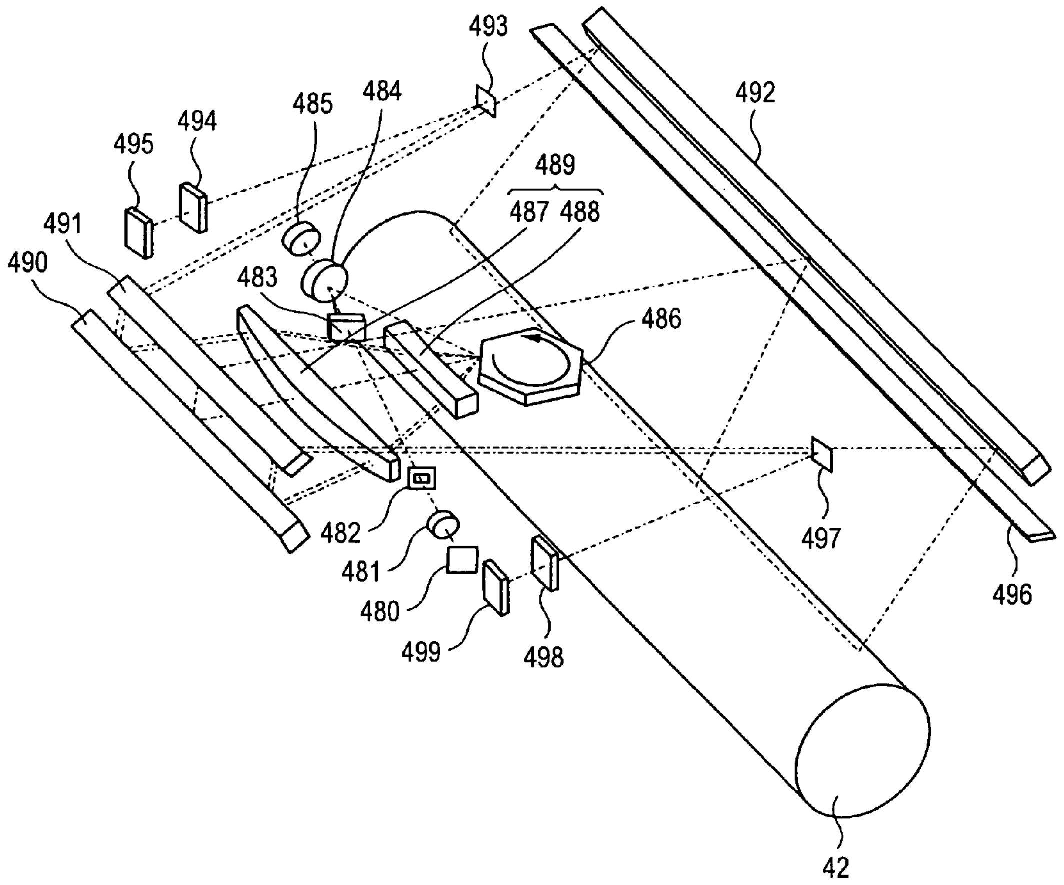
FIG. 8 is a view showing a configuration of a laser exposure unit according to the embodiment of the invention.

FIG. 8 is a view showing a configuration of the laser exposure unit 44.

As shown in the figure, the laser exposure unit 44 includes a surface emitting laser array (VCSEL) 480, which emits an approximately Gaussian distribution light beam as a multibeam light source, a collimator lens 481, which has a function of rendering approximately parallel the light beam emitted from the VCSEL 480, a slit 482 for shaping the light beam, and a cylindrical lens 483, which converges the incident light beam in a sub-scanning direction in a proximity of a deflection surface of a rotating polygon mirror 486.

Also, a half mirror 484, which reflects the light beam at a prescribed ratio (according to the embodiment, it transmits approximately 30% of the light and reflects the remainder of the light), is positioned on the light beam emission side of the cylindrical lens 483. The rear surface of the reflecting surface of the half mirror 484 is of a cylindrical lens shape having curvature only in the main scanning direction, whereby the light beams having transmitted through the half mirror 484 are focused, as a light spot, on an MPD (Monitor Photo Diode) by section of the half mirror rear cylindrical surface in the main scanning direction, and the cylindrical lens 483 in the sub-scanning direction. On the reflecting side of the half mirror 484 is positioned the rotating polygon mirror 486 of, for example, a regular polygon cylinder shape, which has plural deflection surfaces (mirror surfaces) of identical width on the side surface, and which rotates at an equiangular speed around a central axis in the direction of the arrow according to not-shown drive section.

In the proximity of the rotating polygon mirror 486, an fθ lens 489 is positioned as a scanning optical system having a set of two lenses 478 and 488.

The fθ lens 489 has the function of focusing, in the scanning direction, the light beams reflected and deflected by the rotating polygon mirror 486 as a light spot on the photoreceptor drum 42, and moving the light spot, at an approximately constant speed, in the scanning direction on the photoreceptor drum 42.

The light beams which have transmitted through the fθ lens 489, after the light path has been bent into an angular U shape by a first cylindrical mirror 490 and a plane mirror 491, and reflected by a second cylindrical mirror 492, pass through a window 496 and reach the photoreceptor drum 42 which is positioned below. The first cylindrical mirror 490 and the second cylindrical mirror 492 have a power of converging the light beams in the sub-scanning direction, and have the function of placing the rotating polygon mirror 486 and the photoreceptor drum 42 in an approximately conjugated relationship, and thereby correcting a displacement (face tangle error) in the sub-scanning direction occurring on the photoreceptor drum 42, due to fluctuation of the deflection surface of the rotating polygon mirror 486. Furthermore, the curvature in the sub-scanning direction of the collimator lens 481, the cylindrical lens 483, the first cylindrical mirror 490 and the second cylindrical mirror 492 is set in such a way that the beam interval in the sub-scanning direction on the photo receptor drum 42 and the beam interval in a position a few millimeters distant from the photoreceptor drum 42 have an equivalent telecentric relationship.

The photoreceptor drum 42 has a long, thin cylindrical form, the surface of which is coated with a photosensitive material which is sensitive to a light beam, wherein the main scanning direction is arranged in such a way as to correspond to the longitudinal direction of the photoreceptor drum 42. That is, the light spot converged on the photoreceptor drum 42 moves on the photoreceptor drum 42 along the main scanning direction, along with the rotating direction of the rotating polygon mirror 486, meaning that image recording in scanning lines is possible.

Also, the photoreceptor drum 42 rotates at a constant speed, with the rotation axis as the center, according to the not-shown drive section, moving the scanning lines on the photo receptor drum 42 in order in the sub-scanning direction.

Furthermore, a plane mirror 493, which reflects back part of the light beam, a cylindrical lens 494, which focuses the beam in the sub-scanning direction, and a synchronization sensor 495, are positioned on the light path reflected by the plane mirror 491 in order to set the writing position in which the image recording is carried out in the scanning lines.

A plane mirror 497, which reflects back part of the light beam, a cylindrical lens 498, which converges the light beam in the sub-scanning direction, and a beam detector 499, are positioned on the light path reflected by the plane mirror 491 in order to detect the writing position in which the image recording is carried out in the scanning lines.

According to the embodiment, in the laser exposure unit 44 with this kind of configuration, first, with regard to the main scanning direction resolution, it is arranged that a gap is established between the visible image and the invisible image. The main scanning direction resolution is proportional to the quotient of the modulation frequency of a beam light made incident on the VCSEL 480, divided by the deflection speed of the rotating polygon mirror 486. Consequently, the configuration is such that $Fv/Vv>Fi/Vi$ is realized, where Fv is the modulation frequency of a beam light in the visible image laser exposure unit 44, Fi is the modulation frequency of a beam light in the invisible image laser exposure unit 44, Vv is the deflection speed of the rotating polygon mirror 486 in the visible image laser exposure unit 44 and Vi is the deflection speed of the rotating polygon mirror 486 in the invisible image laser exposure unit 44.

A more particular description of this will be made hereafter.

Figure 9:
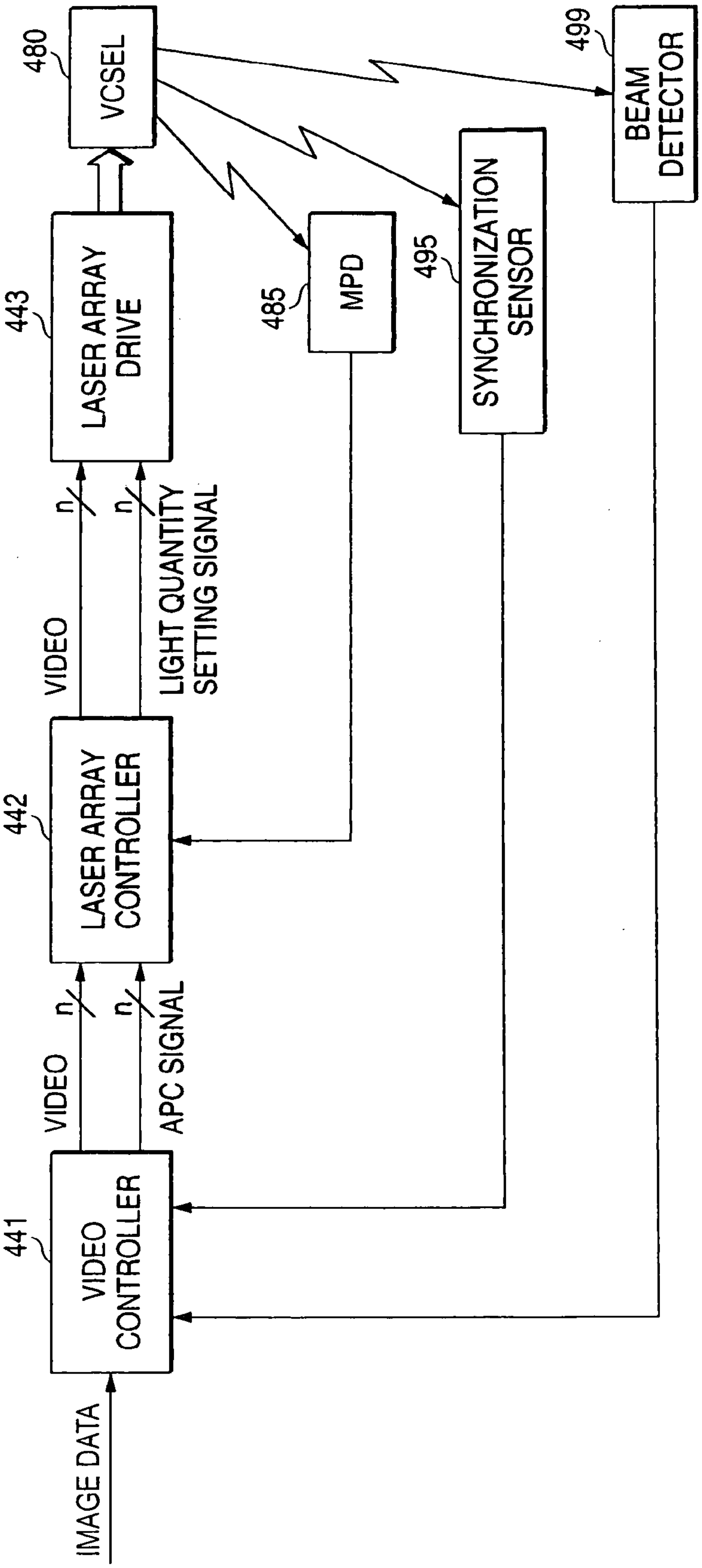
FIG. 9 is a diagram showing a configuration of a laser controller in the laser exposure unit according to the embodiment of the invention.

FIG. 9 is a block diagram showing an outline configuration of a laser controller which emits a light beam into the VCSEL 480. The laser controller includes a video controller 441, a laser array controller 442 and a laser array drive 443. The laser controller is connected to the video controller 441 in such a way that signal input from the synchronization sensor 495 and the beam detector 499 can be accomplished, while being connected to the laser array controller 442 in such a way that signal input from an MPD 485 can be accomplished. The laser array drive 443 output side, however, is connected to the VCSEL 480.

The video controller 441 receives the image data from the IPS 450 and the like in FIG. 7, and outputs an image signal (video signal) and an APC (Auto Power Control) signal to the laser array controller 442 at a prescribed timing based on an output signal (SOS signal) from the synchronization sensor 495. The laser array controller 442 controls a light quantity setting signal to the laser array drive 443 in such a way that the light beam received by the MPD 485 reaches a set quantity of light. The laser array drive 443 converts the image signal to light output, via the VCSEL 480, based on the set quantity of light.

According to such a configuration of the laser controller, the laser array drive 443 repeats an on/off operation at a constant period, thereby making a laser light incident on the VCSEL 480. According to the embodiment, the period is set, for example, as a short period in the visible image laser exposure unit 44, and as a long period in the invisible image laser exposure unit 44.

However, as the deflection speed of the rotating polygon mirror 486 also affects the main scanning direction resolution, as described heretofore, setting is carried out in such a way that the quotient of the modulation frequency of the light beam divided by the deflection speed of the rotating polygon mirror 486 is greater for the visible image than for the invisible image.

Figure 10:
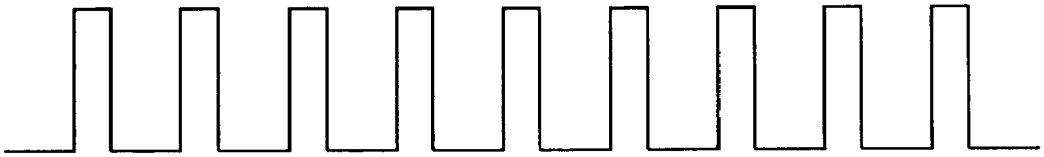
FIGS. 10(A) and 10(B) are diagrams illustrating a difference between a laser light modulation frequency in a case of a visible image and a case of an invisible image in the laser exposure unit according to the embodiment of the invention.
Figure 10:
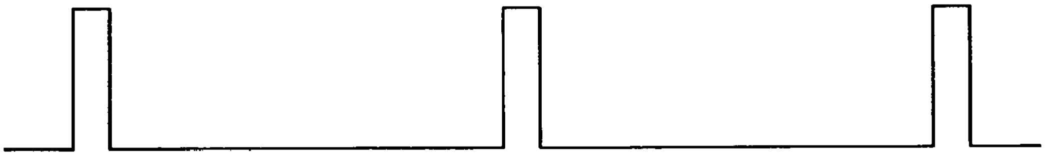

For example, it will be supposed that the main scanning direction resolution of the visible image is 2400 dpi, and the main scanning direction resolution of the invisible image is 600 dpi. In this case, whereby the deflection speed of the rotating polygon mirror 486 in the visible laser exposure unit 44 and the invisible laser exposure unit 44 is not changed, it is preferable that the laser light is modulated in the visible image laser exposure unit 44 as shown in FIG. 10(A), while the laser light is modulated in the invisible image laser exposure unit 44 in such a way that the frequency is one quarter of that in FIG. 10(A), as shown in FIG. 10(B).

Also, according to the embodiment, in the laser exposure unit 44 with the kind of configuration shown in FIG. 8, with regard also to the sub-scanning direction resolution, it is arranged that a gap is established between the visible image and the invisible image. The sub-scanning direction resolution is proportional to the product of the number of beam lights made incident on the VCSEL 480, multiplied by the deflection speed of the rotating polygon mirror 486. Consequently, the configuration is such that $Nv \times Vv > Ni \times Vi$ is realized, where Nv is the number of beam lights in the visible image laser exposure unit 44, Ni is the number of beam lights in the invisible image laser exposure unit 44, Vv is the deflection speed of the rotating polygon mirror 486 in the visible image laser exposure unit 44 and Vi is the deflection speed of the rotating polygon mirror 486 in the invisible image laser exposure unit 44.

A more particular description of this will be made hereafter.

Figure 11:
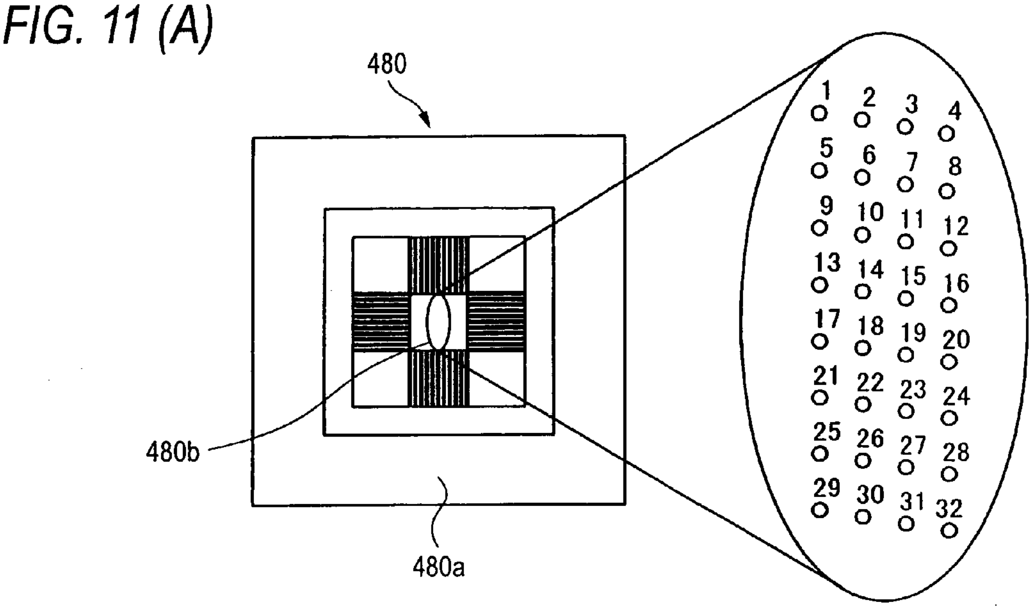
FIGS. 11(A) and 11(B) are diagrams illustrating a difference between the number of laser lights in a case of the visible image and a case of the invisible image in the laser exposure unit according to the embodiment of the invention.
Figure 11:
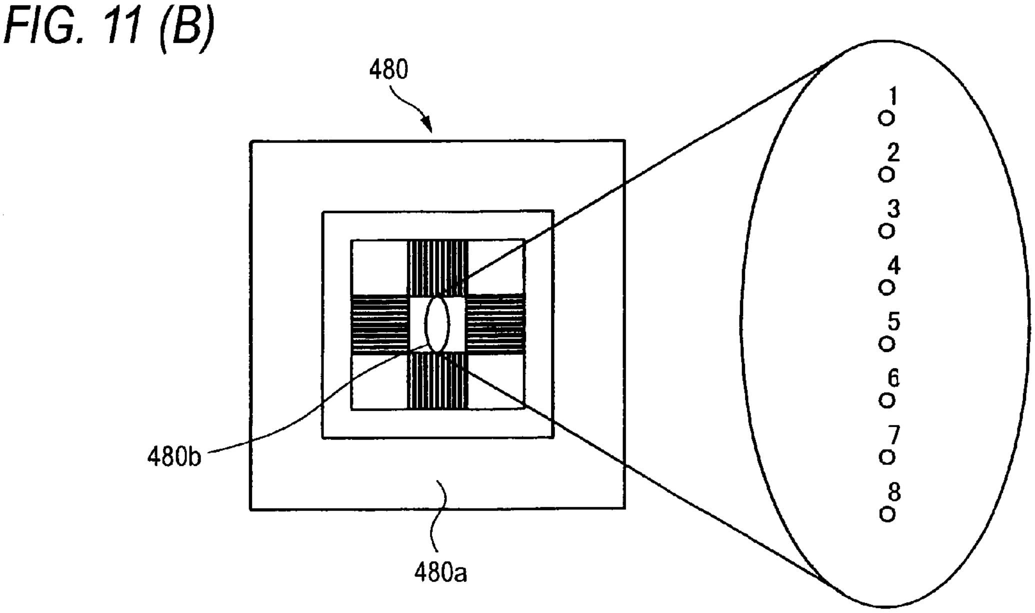

FIGS. 11(A) and 11(B) are enlarged diagrams showing the VCSEL 480 in the laser exposure unit 44 in FIG. 8. Of these, FIG. 11(A) shows the VCSEL 480 in the visible image laser exposure unit 44, while FIG. 11(B) shows the VCSEL 480 in the invisible image laser exposure unit 44.

As shown in FIG. 11(A), the VCSEL 480 has a light emitting element 480*b* affixed inside a package 480*a*, wherein a light emitting portion which emits 32 light beams is formed two-dimensionally on one light emitting element 480*b*. Each light emitting portion on the light emitting element 480*b* is distributed in such a way that the locus in the main scanning direction is not superimposed in the sub-scanning direction, whereby the interval of the scanning lines, which are scanned by each light emitting portion on the photo receptor drum 42, forms the resolution in the sub-scanning direction of the optical scanner. According to the embodiment, the configuration is such that a magnification of the optical system is set in such a way that the sub-scanning direction interval is 7 μm in the light emitting portion and 10.6 μm on the photoreceptor drum 42, meaning that a 2400 dpi image formation is possible.

In FIG. 11(B), however, there are 8 light emitting portions on one light emitting element 480*b*. As a result, the configuration is such that 8 light beams are emitted from one light emitting element 480*b*, meaning that a 600 dpi image formation is possible.

In this case, however, it is supposed that the deflection speed of the rotating polygon mirror 486 in the visible image laser exposure unit 44 and the invisible image laser exposure unit 44 is the same. In the event that the deflection speed of the rotating polygon mirror 486 differs, this needs to be taken into consideration when determining the number of light beams.

(Controller)

As shown in FIGS. 4 to 6, the image forming apparatus 400 according to the embodiment includes the controller 460. According to the embodiment, under the control of the controller 460, an interval for correcting an image displacement is differentiated between the visible image case and the invisible image case. That is, Tv<Ti, where Tv is the interval for correcting a displacement with respect to the visible image, and Ti is the interval for correcting a displacement with respect to the invisible image.

Supposing that on one of a certain number of corrections of the visible image displacement, correction of the invisible image displacement is also carried out, the operation of the controller 460 in such a case will now be described.

Figure 12:
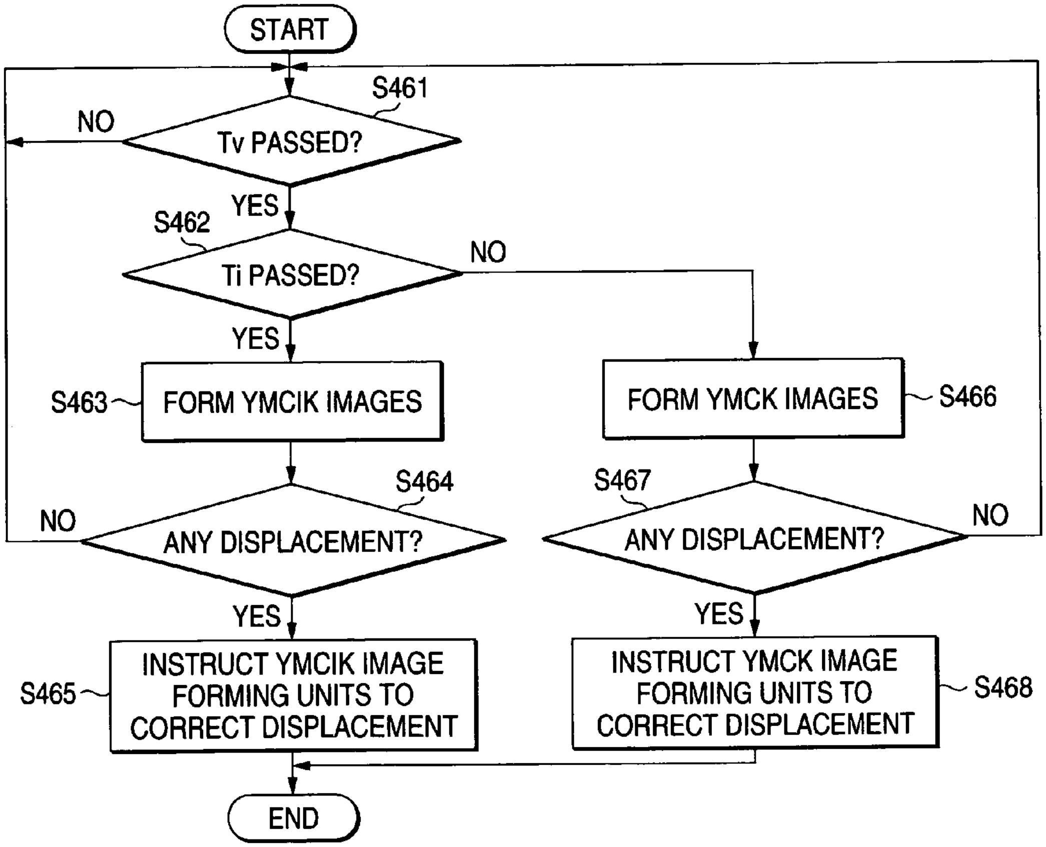
FIG. 12 is a flowchart showing a first operation example of a controller according to the embodiment of the invention.

FIG. 12 is a flowchart showing a first operation example of the controller 460. The operation example presupposes the image forming apparatus 400 shown in FIG. 4.

First, the controller 460 determines whether Tv has passed, that is, whether or not the timing is right for correcting the visible image displacement (Step 461). As a result, if it is determined that Tv has not passed, Step 461 is repeated. Conversely, if it is determined that Tv has passed, the controller 460 determines whether Ti has also passed, that is, whether or not the timing is right even for correcting the invisible image displacement (Step 462).

As a result, if it is determined that Ti has passed, image formation is instructed to the image formation units 41Y, 41M, 41C, 41I and 41K (Step 463). Then, the controller 460 determines whether or not a report that a displacement has occurred has been received from the image sensor 422 (Step 464). As a result, if it is determined that no displacement has occurred, the operation returns to Step 461. If it is determined that the displacement has occurred, instruction is given to the image formation units 41Y, 41M, 41C, 41I and 41K to adjust the start timing of the image formation in order that no displacement occurs (Step 465).

If it is determined that Ti has not passed, image formation is instructed to the image formation units 41Y, 41M, 41C, and 41K, but image formation is not instructed to the image formation unit 41I (Step 466). Then, the controller 460 determines whether or not a report that a displacement has occurred has been received from the image sensor 422 (Step 467). As a result, if it is determined that no displacement has occurred, the operation returns to Step 461. If it is determined that the displacement has occurred, instruction is given to the image formation units 41Y, 41M, 41C and 41K to adjust the start timing of the image formation in order that no displacement occurs (Step 468).

The adjustment of the image formation start timing in this case is determined by the video controller 441 in FIG. 9, based on a signal from the synchronization sensor 495.

That is, the operation example is one wherein, under the condition Tv<Ti, at the interval Tv, instruction for image formation and, in the event that there is a displacement, for correction thereof, is given to the image formation units 41Y, 41M, 41C and 41K, while at the interval Ti, instruction for image formation and, in the event that there is a displacement, for correction thereof, is given to the image formation unit 41I in addition to the aforementioned units.

Figure 13:
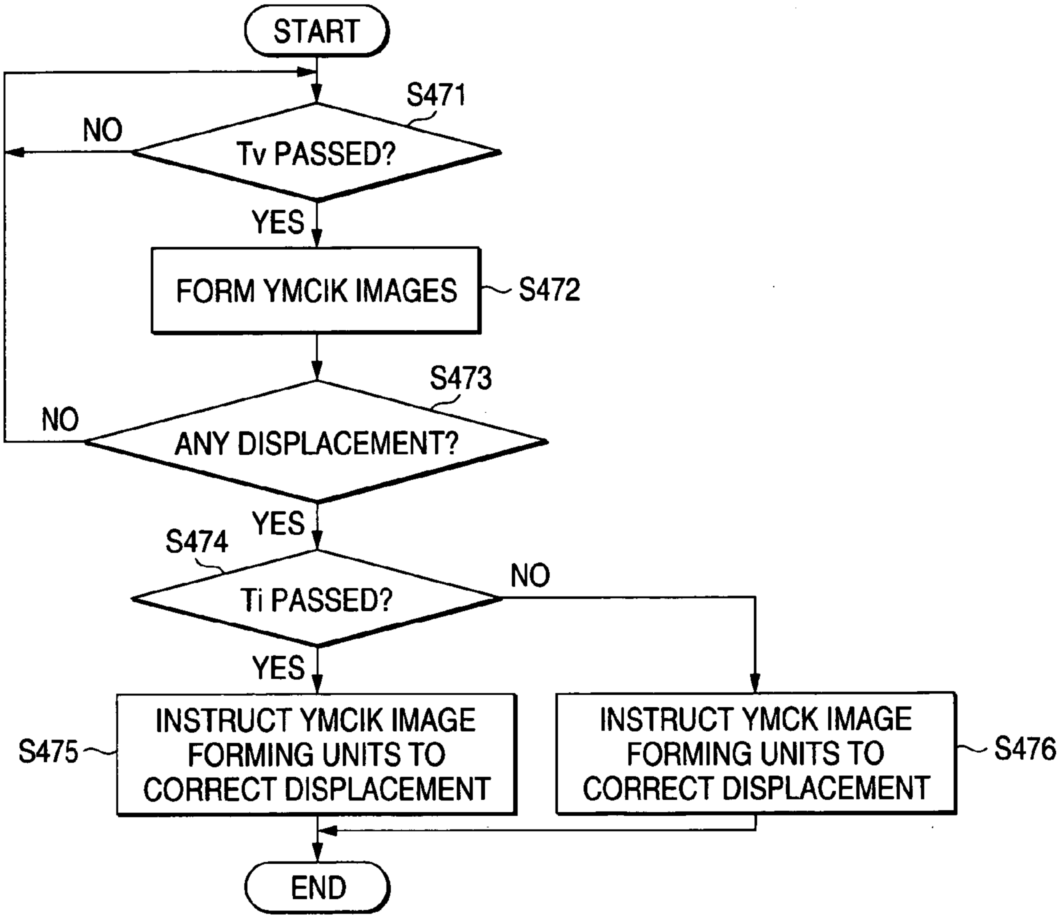
FIG. 13 is a flowchart showing a second operation example of the controller according to the embodiment of the invention.

FIG. 13 is a flowchart showing a second operation example of the controller 460. The operation example presupposes the image forming apparatus 400 shown in FIG. 4.

First, the controller 460 determines whether Tv has passed, that is, whether or not the timing is right for correcting the visible image displacement (Step 471). As a result, if it is determined that Tv has not passed, Step 471 is repeated. Conversely, if it is determined that Tv has passed, image formation is instructed to the image formation units 41Y, 41M, 41C, 41I and 41K (Step 472). Then, the controller 460 determines whether or not a report that a displacement has occurred has been received from the image sensor 422 (Step 473).

As a result, if it is determined that no displacement has occurred, the operation returns to Step 471. Conversely, if it is determined that the displacement has occurred, the controller 460 determines whether Ti has also passed, that is, whether or not the timing is right even for correcting the invisible image displacement (Step 474). As a result, if it is determined that Ti has passed, instruction is given to the image formation units 41Y, 41M, 41C, 41I and 41K to adjust the start timing of the image formation in order that no displacement occurs (Step 475). Conversely, if it is determined that Ti has not passed, instruction is given to the image formation units 41Y, 41M, 41C and 41K to adjust the start timing of the image formation in order that no displacement occurs, but adjustment instruction is not given to the image formation unit 41I (Step 476).

The adjustment of the image formation start timing in this case is determined by the video controller 441 in FIG. 9, based on a signal from the synchronization sensor 495.

That is, the operation example is one wherein, under the condition Tv<Ti, at the interval Tv, instruction for image formation is given to the image formation units 41Y, 41M, 41C, 41I and 41K, instruction for displacement correction is given to the image formation units 41Y, 41M, 41C and 41K at the interval Tv, while at the interval Ti, instruction for image formation is given to the image formation unit 41I in addition to the aforementioned units.

It is not necessary that the frequency for correcting the visible image displacement and the frequency for correcting the invisible image displacement, are constant. For example, the configuration may be such that the correction of the visible image displacement is carried out every morning when the power is turned on, while the correction of the invisible image displacement, as well as being carried out every morning when the power is turned on, is also carried out every time a prescribed number of sheets of paper is printed. Also, with regard to the visible image, as there is no requirement for a particularly high quality, it is possible to carry out no displacement correction at all.

As has been described heretofore, according to the embodiment, the configuration and operation of the image processor, the optical scanner and the controller are such as to establish a gap between the case of the visible image formation and the case of the invisible image formation, whereby the quality of the invisible image is kept low in comparison with the visible image. By section of this kind of configuration, an increase in the cost of the image forming apparatus capable of forming the invisible code image can be avoided.

What is claimed is:

1. An image forming apparatus comprising:

a first toner image forming section that forms a visible toner image;

a second toner image forming section that forms an invisible toner image, a resolution of the invisible toner image is lower than a resolution of the visible toner image; and a transfer section that transfers to a medium the visible toner image and the invisible toner image;

wherein the resolution of the visible toner image in a main scanning direction is higher than the resolution of the invisible toner image in the main scanning direction, wherein the first toner image forming section and the second toner image forming section include a first scanning section and a second scanning section scanning a laser light on a photoreceptor, respectively, and the first scanning section and the second scanning section are configured to satisfy the following relation:

$$Fv/Vv > Fi/Vi$$

where Fv and Fi are a laser light modulation frequency in the first scanning section and the second scanning section, respectively, and Vv and Vi are a scanning speed of the first scanning section and the second scanning section, respectively.

2. The image forming apparatus according to claim 1, wherein each of the first scanning section and the second scanning section includes a light source comprising a surface emitting laser array.

3. The image forming apparatus according to claim 1, wherein an infrared light absorptance of a colorant used in the first toner image forming section is lower than an infrared light absorptance of a colorant used in the second toner image forming section.

4. The image forming apparatus according to claim 1, wherein the resolution of the visible toner image in a sub-scanning direction is higher than the resolution of the invisible toner image in the sub-scanning direction.

5. The image forming apparatus according to claim 4, wherein the first toner image forming section and the second toner image forming section include a first scanning section and a second scanning section scanning a laser light on a photoreceptor, respectively, and the first scanning section and the second scanning section are configured to satisfy the following relation:

$$Nv \times Vv > Ni \times Vi$$

where Nv and Ni are the number of laser lights scanned by the first scanning section and the second scanning section, respectively, and Vv and Vi are the scanning speed of the first scanning section and the second scanning section, respectively.

6. The image forming apparatus according to claim 5, wherein each of the first scanning section and the second scanning section includes a light source comprising a surface emitting laser array.

7. An image forming apparatus comprising:

a first toner image forming section that forms a visible toner image;

a second toner image forming section that forms an invisible toner image;

a first correction section that corrects a position of the visible toner image at a first correction interval; and a second correction section that corrects a position of the invisible toner image at a second correction interval longer than the first correction interval.

8. An image forming method comprising:

forming a visible toner image in a first resolution;

forming an invisible toner image in a second resolution which is lower than the first resolution; and transferring the visible toner image and the invisible toner image onto the medium;

further comprising, before forming the visible toner image and the invisible toner image:

generating image data which is the base of the visible image in a third resolution; and generating image data which is the base of the invisible image in a fourth resolution which is lower than the third resolution.

9. An image forming method comprising:

forming a visible toner image;

forming an invisible toner image;

correcting a position of the visible toner image at a first correction interval; and correcting a position of the invisible toner image at a second correction interval longer than the first correction interval.

* * * * *